(12) United States Patent
Liu et al.

(10) Patent No.: US 11,644,701 B2
(45) Date of Patent: May 9, 2023

(54) DISPLAY ASSEMBLY, TERMINAL DEVICE, AND MANUFACTURING METHOD OF DISPLAY ASSEMBLY

(71) Applicant: Beijing Xiaomi Mobile Software Co., Ltd., Beijing (CN)

(72) Inventors: Feng Liu, Beijing (CN); Jie Yang, Beijing (CN); Shihwei Lu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 25 days.

(21) Appl. No.: 17/146,897

(22) Filed: Jan. 12, 2021

(65) Prior Publication Data
US 2021/0397037 A1    Dec. 23, 2021

(30) Foreign Application Priority Data

Jun. 19, 2020  (CN) .......................... 202010568211.0

(51) Int. Cl.
*G02F 1/1333* (2006.01)
*G02F 1/1335* (2006.01)
*G02F 1/13357* (2006.01)

(52) U.S. Cl.
CPC .. *G02F 1/133325* (2021.01); *G02F 1/133317* (2021.01); *G02F 1/133504* (2013.01); *G02F 1/133512* (2013.01); *G02F 1/133602* (2013.01); *G02F 2202/28* (2013.01)

(58) Field of Classification Search
CPC .............................................. G02F 1/133317
See application file for complete search history.

(56) References Cited

U.S. PATENT DOCUMENTS

| | | | |
|---|---|---|---|
| 2008/0018826 | A1 | 1/2008 | Bae et al. |
| 2013/0170116 | A1 | 7/2013 | In et al. |
| 2016/0202537 | A1 | 7/2016 | Cho |
| 2016/0291392 | A1 | 10/2016 | In et al. |
| 2018/0113353 | A1* | 4/2018 | Chen ................. G02F 1/133528 |

(Continued)

FOREIGN PATENT DOCUMENTS

| | | |
|---|---|---|
| JP | 2004310038 A | 11/2004 |
| KR | 20060005154 A | 1/2006 |

(Continued)

OTHER PUBLICATIONS

Notification of Reason for Refusal for Korean Application No. 10-2020-0161804, dated Feb. 3, 2022.

(Continued)

*Primary Examiner* — Edmond C Lau
(74) *Attorney, Agent, or Firm* — Finnegan, Henderson, Farabow, Garrett & Dunner, L.L.P.

(57) ABSTRACT

A display assembly includes: a frame; a liquid crystal panel installed in the frame; a glass diffusion plate attached to a light incident surface of the liquid crystal panel; and a film structure including one or more optical films and attached between the liquid crystal panel and the glass diffusion plate, wherein a light incident surface of the film structure faces the glass diffusion plate, a light exiting surface of the film structure faces the light incident surface of the liquid crystal panel, and the liquid crystal panel, the glass diffusion plate, and the film structure are attached together to form an integrated structure.

12 Claims, 5 Drawing Sheets

(56) References Cited

U.S. PATENT DOCUMENTS

2018/0164619 A1    6/2018  Kim
2020/0124904 A1    4/2020  In et al.
2020/0233255 A1*  7/2020  Lin .................. G02F 1/133504

FOREIGN PATENT DOCUMENTS

| KR | 20110052071 A | 5/2011 |
| KR | 20130122884 A | 11/2013 |
| KR | 20150092392 A | 8/2015 |

OTHER PUBLICATIONS

Notice of Reasons for Refusal for Japanese Application No. 2021-018658, dated Mar. 29, 2022.

Extended European Search Report in European Application No. 21151773.5, dated Jun. 30, 2021.

* cited by examiner

DISPLAY ASSEMBLY, TERMINAL DEVICE, AND MANUFACTURING METHOD OF DISPLAY ASSEMBLY

CROSS-REFERENCE TO RELATED APPLICATIONS

This application is based upon and claims priority to Chinese Patent Application No. 202010568211.0 filed on Jun. 19, 2020, the content of which is hereby incorporated by reference in its entirety.

TECHNICAL FIELD

The disclosure relates to the field of electronic devices, and particularly relates to a display assembly, a terminal device, and a manufacturing method of the display assembly.

BACKGROUND

With the continuous development of terminal devices and the continuous improvement of user needs, the terminal devices, such as television devices and smart phones, are developing in the direction of a high screen-to-body ratio. A width of a black region of a liquid crystal panel on an existing terminal device may be 6.5 mm, and the black region may be directly supported by a frame to complete an assembly of the liquid crystal panel. However, as the width of the black region of the liquid crystal panel is shortened from 6.5 mm to 0.9 mm, the assembly of the liquid crystal panel by supporting the black region may have reduced assembly reliability.

SUMMARY

According to a first aspect of embodiments of the disclosure, a display assembly includes: a frame (bezel); a liquid crystal panel installed in the frame; a glass diffusion plate attached to a light incident surface of the liquid crystal panel; and a film structure including one or more optical films and attached between the liquid crystal panel and the glass diffusion plate, wherein a light incident surface of the film structure faces the glass diffusion plate, a light exiting surface of the film structure faces the light incident surface of the liquid crystal panel, and the liquid crystal panel, the glass diffusion plate, and the film structure are attached together to form an integrated structure.

According to a second aspect of embodiments of the disclosure, a terminal device includes the display assembly in the above first aspect.

According to a third aspect of embodiments of the disclosure, a manufacturing method of the display assembly in the above first aspect is provided. The manufacturing method includes: attaching the film structure to the light incident surface of the liquid crystal panel; attaching the glass diffusion plate to the light incident surface of the film structure, wherein the film structure is located between the liquid crystal panel and the glass diffusion plate; and installing in the frame the liquid crystal panel, the glass diffusion plate, and the film structure which are attached together.

It should be understood that the above general description and the following detailed description are exemplary and explanatory, and do not limit the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Figure 1:
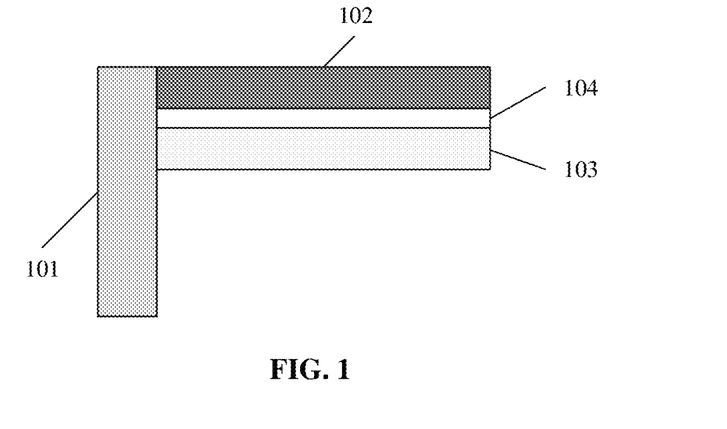
FIG. 1 is a schematic diagram of a display assembly according to an exemplary embodiment.

FIG. 1 is a schematic diagram of a display assembly according to an exemplary embodiment. As shown in FIG. 1, the display assembly includes: a frame 101; a liquid crystal panel 102 installed in the frame 101; a glass diffusion plate 103 attached to a light incident surface of the liquid crystal panel 102; and a film structure 104 including one or more optical films and attached between the liquid crystal panel 102 and the glass diffusion plate 103. A light incident surface of the film structure 104 faces the glass diffusion plate 103, a light exiting surface of the film structure 104 faces the light incident surface of the liquid crystal panel 102, and the liquid crystal panel 102, the glass diffusion plate 103 and the film structure 104 are attached together to form an integrated structure.

The display assembly may be applied to terminal devices. The terminal devices include mobile terminals and fixed terminals. The mobile terminals include, but are not limited to, mobile phones, tablet computers, notebook computers, and the like. The fixed terminals include, but are not limited to, television devices, desktop computers, and the like.

The frame 101 is a frame body that surrounds a terminal device and is exposed outside. The frame 101 may be a frame body made of metals, plastics, or synthetic materials containing glass and plastics.

In some embodiments, a width of the frame 101 may be 3.3 mm or 0.6 mm, which is not limited in the disclosure.

The liquid crystal panel 102 is configured to display information. In some embodiments, the frame 101 may form an accommodating space, and the liquid crystal panel 102 is embedded in the accommodating space.

The glass diffusion plate 103 is configured to diffuse light, so that transmitted light are evenly dispersed. The glass diffusion plate 103 is attached to the light incident surface of the liquid crystal panel 102. The light incident surface of the liquid crystal panel 102 is an opposite surface of the light exiting surface of the liquid crystal panel 102.

In some embodiments, the glass diffusion plate 103 has high strength and is not easy to be deformed. The glass diffusion plate 103 may also be configured to support the liquid crystal panel 102.

Compared with the existing diffusion plates made of plastic materials, the glass diffusion plate 103 made of glass materials has high strength and is not easy to be deformed, which may reduce the situation that the expansion gap inside the glass diffusion plate is large due to environmental changes, and may realize better support for the liquid crystal panel.

The film structure 104 is attached between the liquid crystal panel 102 and the glass diffusion plate 103, for brightening the display effect of the display assembly.

In some embodiments, the film structure 104 includes, but is not limited to, a brightness enhancement film and a diffusion film. The brightness enhancement film includes, but is not limited to, a lens or a light converging sheet.

In the embodiments of the disclosure, the light incident surface is a surface through which light enters, and the light exiting surface is a surface from which light exits. For example, the light incident surface of the liquid crystal panel 102 is a surface through which light enters the liquid crystal panel 102; the light incident surface of the film structure 104 is a surface through which light enters the film structure 104; and the light exiting surface of the film structure 104 is a surface from which light exits the film structure 104. The light incident surface and the light exiting surface of each of the liquid crystal panel 102, the glass diffusion plate 103, and the film structure 104 are oppositely arranged surfaces.

Figure 2:
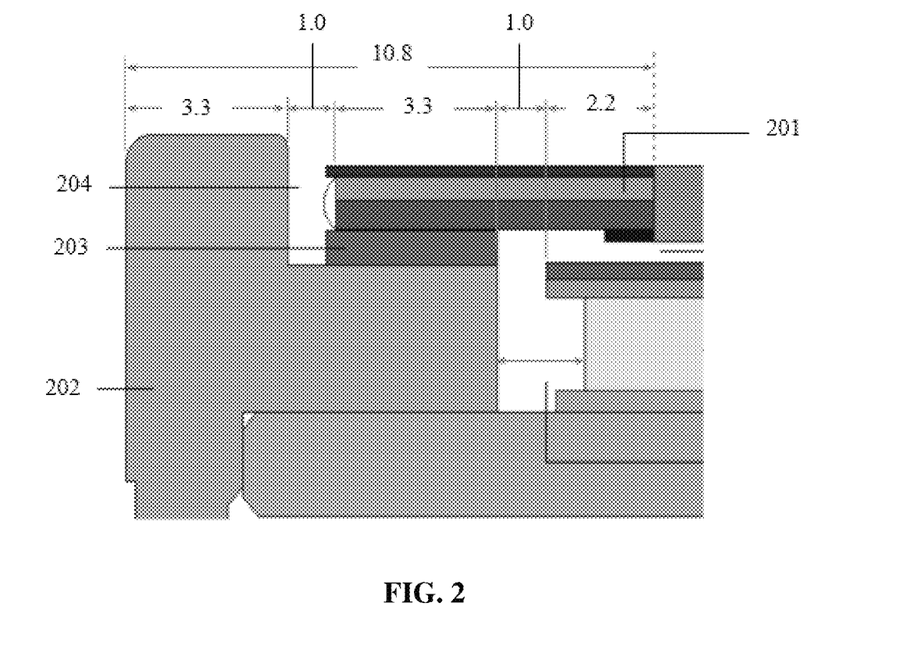
FIG. 2 is a schematic diagram of a display assembly according to an exemplary embodiment.

In related technologies, as shown in FIG. 2, a width of a frame 202 is 3.3 mm, a width of a black region of a liquid crystal panel 201 is 6.5 mm, and a gap 204 between the liquid crystal panel 201 and the frame 202 is 1 mm. The black region part of the liquid crystal panel 201 is adhered on the frame 202 through an adhesive tape 203 to fix the liquid crystal panel 201. An adhering width between the black region and the frame is 3.3 mm. However, when the width of the black region of the liquid crystal panel is shortened from 6.5 mm to 0.9 mm, if the frame and the black region of the liquid crystal panel are adhered directly through an adhesive tape, the assembly stability of the liquid crystal panel is reduced due to the decrease in the adhering width. Furthermore, a width of a non-display region outside a display region is up to 10.8 mm, so that there is a low screen-to-body ratio.

Based on this, the embodiments of the disclosure provide a display assembly. In the display assembly, the width of the frame may be 0.6 mm, and the width of the black region of the liquid crystal panel may be 0.9 mm. The width of the non-display region outside the display region in the display assembly may approach 1.5 mm, so that the screen-to-body ratio may be increased through the embodiments of the disclosure.

Furthermore, in the embodiments of the disclosure, the film structure is attached to the surface of the liquid crystal panel, and the glass diffusion plate is attached to the surface of the film structure. In other words, in the embodiments of the disclosure, the black region is not directly supported through the frame to realize the assembly of the liquid crystal panel. Instead, the whole liquid crystal panel is indirectly supported through the glass diffusion plate to realize the assembly of the liquid crystal panel. In this way, the support area may be increased, and the reliability of assembly of the display assembly may be improved. Furthermore, in the embodiments of the disclosure, the assembly manner of the liquid crystal panel may adapt to the trend of narrowing of the black region of the liquid crystal panel, so that the screen-to-body ratio of a display screen may be further improved, and the assembly of the liquid crystal panel has universality.

Figure 3:
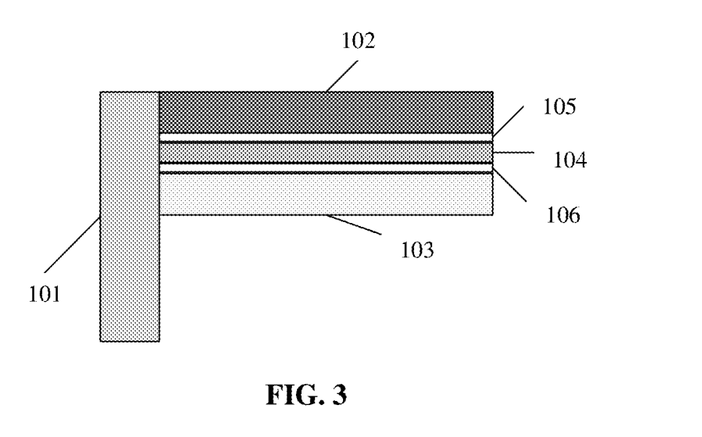
FIG. 3 is a schematic diagram of a display assembly according to an exemplary embodiment.

In some embodiments, as shown in FIG. 3, a transparent, first attaching layer 105 is disposed between the liquid crystal panel 102 and the film structure 104, and the first attaching layer 105 is configured to completely attach the film structure 104 to the light incident surface of the liquid crystal panel 102; and a transparent, second attaching layer 106 is disposed between the film structure 104 and the glass diffusion plate 103, and the second attaching layer 106 is configured to completely attach the glass diffusion plate 103 to the light incident surface of the film structure 104.

In the embodiments of the disclosure, the film structure 104 is attached to the light incident surface of the liquid crystal panel 102 through the first attaching layer 105, and the glass diffusion plate 103 is attached to the light incident surface of the film structure 104 through the second attaching layer 106. Both the first attaching layer 105 and the second attaching layer 106 may be made of transparent adhesives. The transparent adhesives include, but are not limited to, optical adhesive.

In the embodiments, the liquid crystal panel 102, the film structure 104, and the glass diffusion plate 103 are completely attached together. The attaching region includes a middle region and an edge region, and the edge region is located at a periphery of the middle region. The complete attaching may include attaching to each region, that is, attaching to the middle region and the edge region, rather than only to the edge region.

In some embodiments, an area of a first attaching layer is greater than a preset first area threshold and less than or equal to a first area of the film structure facing the surface of the liquid crystal panel; and an area of a second attaching layer is greater than a preset second area threshold and less than or equal to a second area of the film structure facing the surface of the glass diffusion plate. For example, the first area threshold may be greater than or equal to a half of the first area; and the second area threshold may be greater than or equal to a half of the second area.

In the embodiments of the disclosure, the liquid crystal panel, the film structure and the glass diffusion plate are completely attached. Through the characteristic that the glass diffusion plate is not easy to be deformed, the possibility of deformation of the film structure between the liquid crystal panel and the glass diffusion plate due to environmental influences may be reduced, so that the assembly reliability of the liquid crystal panel is higher.

Figure 4:
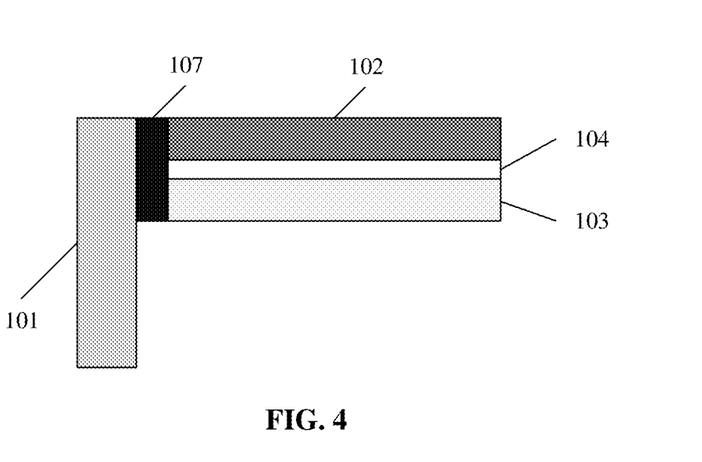
FIG. 4 is a schematic diagram of a display assembly according to an exemplary embodiment.

In some embodiments, as shown in FIG. 4, the display assembly further includes: a bonding agent 107 located on an inner side of the frame 101 and configured to bind the side surfaces of the glass diffusion plate 103, the film structure 104, and the liquid crystal panel 102 to the frame 101.

In some embodiments, the following operations may be performed so that the glass diffusion plate, the film structure and the liquid crystal panel are attached to the frame. Firstly, the liquid crystal panel, the glass diffusion plate and the film structure are attached; and then, the liquid crystal panel, the glass diffusion plate and the film structure which are attached together are bonded to the frame through the bonding agent.

In some embodiments, the bonding agent is made of adhesives. A bonding width of the bonding agent is positively related to a bonding strength of the bonding agent. Situations with a high requirement for bonding strength may be met by increasing the bonding width of the bonding agent. For example, the bonding width of the bonding agent may be between 0.4 mm and 0.8 mm, which is not limited in the disclosure.

In some embodiments, the bonding agent is coated on the frame 101 through an adhesive dispensing process.

In some embodiments, a projection region of the attached liquid crystal panel, glass diffusion plate and film structure onto the frame can be applied with the adhesive through an adhesive dispensing machine. A length of the projection region on the frame is greater than or equal to a sum of a thickness of each of the liquid crystal panel, the film structure and the glass diffusion plate. It can be understood that coating the bonding agent through the adhesive dispensing process may realize precise dispensing to improve the assembly reliability of the display assembly.

In some embodiments, the bonding agent is a waterproof bonding agent. By using the waterproof bonding agent to fix the liquid crystal panel, the glass diffusion plate and the film structure, the water resistance of the display assembly may be improved.

Figure 5:
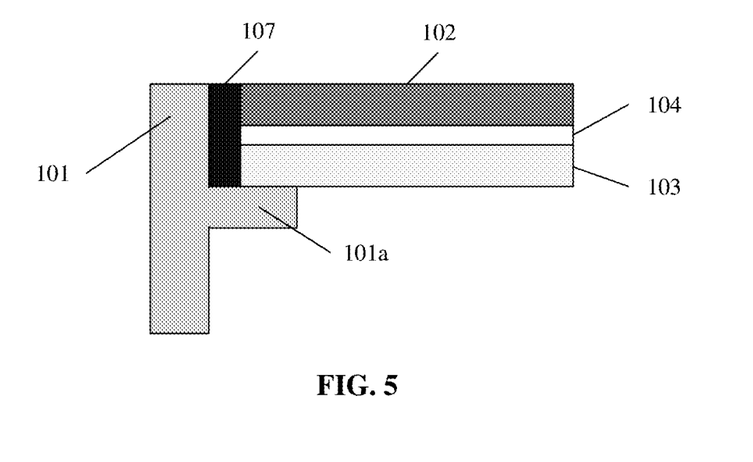
FIG. 5 is a schematic diagram of a display assembly according to an exemplary embodiment.

In some embodiments, as shown in FIG. 5, a lug boss 101a is formed on the frame 101 in a direction extending toward an inside of the frame 101; and the edge of the glass diffusion plate 103 is carried on the lug boss 101a.

In the embodiments of the disclosure, the edge of the glass diffusion plate is carried on the lug boss, and the glass diffusion plate may be supported through the lug boss, so that the glass diffusion plate can better support the liquid crystal panel, so as to improve the assembly strength of the liquid crystal panel.

Figure 6:
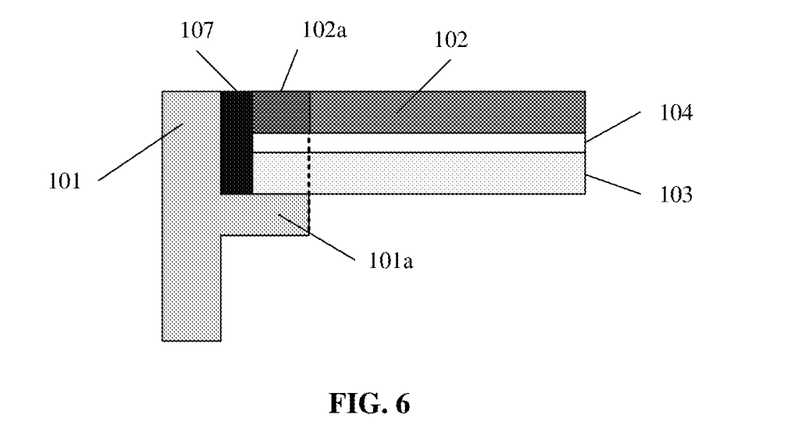
FIG. 6 is a schematic diagram of a display assembly according to an exemplary embodiment.

In some embodiments, as shown in FIG. 6, a black region 102a is formed on the liquid crystal panel 102; the black region 102a is located at the edge of the liquid crystal panel 102; and the projection of the lug boss 101a onto the liquid crystal panel 102 is located in the black region 102a. The black region is located at the edge of the liquid crystal panel and is configured to shield light so as to reduce light leakage at the edge of the liquid crystal panel. The black region may be formed by a black matrix, and the black region surrounds the edge region of the liquid crystal panel to form a closed ring.

In the embodiments of the disclosure, the projection of the lug boss onto the liquid crystal panel is located in a region where the black region is located. In other words, the black region can also be configured to shield the lug boss to reduce exposure of the lug in a display region of the liquid crystal panel, so that the display region of the liquid crystal panel may be increased.

Figure 7:
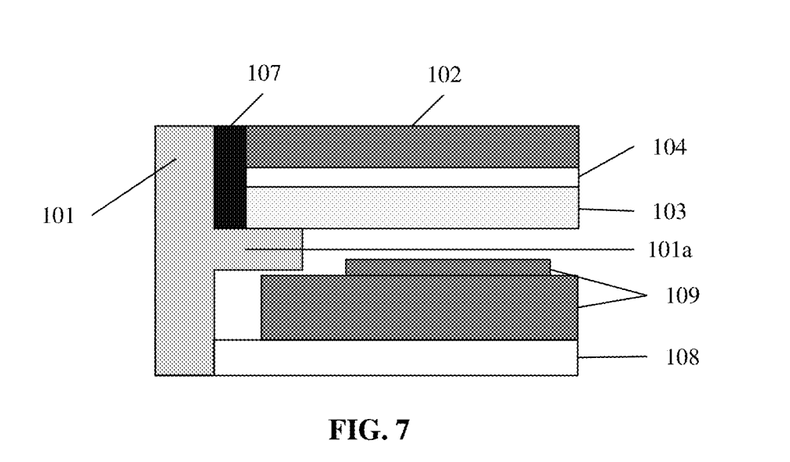
FIG. 7 is a schematic diagram of a display assembly according to an exemplary embodiment.

In some embodiments, as shown in FIG. 7, the display assembly further includes: a back plate 108 located below the lug boss 101a; and a light source component 109 installed on the back plate 108 and located between the glass diffusion plate 103 and the back plate 108.

In the embodiments of the disclosure, the liquid crystal panel is a liquid crystal-liquid crystal panel, and a backlight source adopted by the liquid crystal-liquid crystal panel can provide display light for the liquid crystal-liquid crystal panel through the light source component on the back plate. The back plate and the glass diffusion plate are respectively located on two opposite sides of the lug boss, and the light source component is located between the back plate and the glass diffusion plate. In the embodiments of the disclosure, the back plate, the light source component, the glass diffusion plate, the film structure and the liquid crystal panel are assembled in a laminated manner to form a display assembly.

The glass diffusion plate is configured to diffuse the display light generated by the light source component, so that the display light may be evenly dispersed.

The light source component includes: a plurality of point light sources (such as Light Emitting Diode (LED)) or a plurality of line light sources (such as Cold Cathode Fluorescent Lamp (CCFL)).

In the embodiments of the disclosure, the light source component is located below the liquid crystal panel instead of on the side, so the display assembly is a direct below display assembly.

In some embodiments, a light emitting surface of the light source component faces the glass diffusion plate, and there is no other optical film between the light source component and the glass diffusion plate. For example, the other optical films include: a light guide sheet and/or a diffusion sheet.

In some embodiments, the display assembly further includes: a diffusion sheet; the diffusion sheet is completely attached to the glass diffusion plate; and the film structure is completely attached to the glass diffusion plate, in which the diffusion sheet is located between the film structure and the glass diffusion plate. By completely attaching the diffusion sheet to the glass diffusion plate, the display light may be further evenly dispersed, so that the display effect of the display assembly may be improved.

In some embodiments, a gap is formed between the light source component and the glass diffusion plate. The gap between the light source component and the glass diffusion plate is configured to provide a tolerance space for process errors of the light source component and the glass diffusion plate, thereby to facilitate the assembly of the light source component and the glass diffusion plate.

In some embodiments, a gap is formed between the frame and the side edge of the light source component. The gap between the frame and the side edge of the light source component is configured to provide a tolerance space for process errors of the light source component and the frame, thereby to facilitate the assembly of the light source component and the glass diffusion plate.

Embodiments of the disclosure further provide a terminal device. The terminal device includes the display assembly described above. The terminal device may be a wearable electronic device or a mobile terminal. The mobile terminal may include a mobile phone, a notebook computer and a tablet computer. The wearable electronic device may include a smart watch. They are not limited in the disclosure.

In the embodiments of the disclosure, in the terminal device, the glass diffusion plate is attached to the light incident surface of the liquid crystal panel, and the film structure is attached between the liquid crystal panel and the glass diffusion plate. Accordingly, the black region is no longer directly supported through the frame to realize the assembly of the liquid crystal panel. Instead, the whole liquid crystal panel is indirectly supported through the glass diffusion plate to realize the assembly of the liquid crystal panel. In this way, the support area may be increased, and the reliability of assembly of the display assembly may be improved. Furthermore, in the embodiments of the disclosure, the assembly manner of the liquid crystal panel may adapt to the trend of narrowing of the black region of the liquid crystal panel, so that the assembly of the liquid crystal panel has universality.

Figure 8:
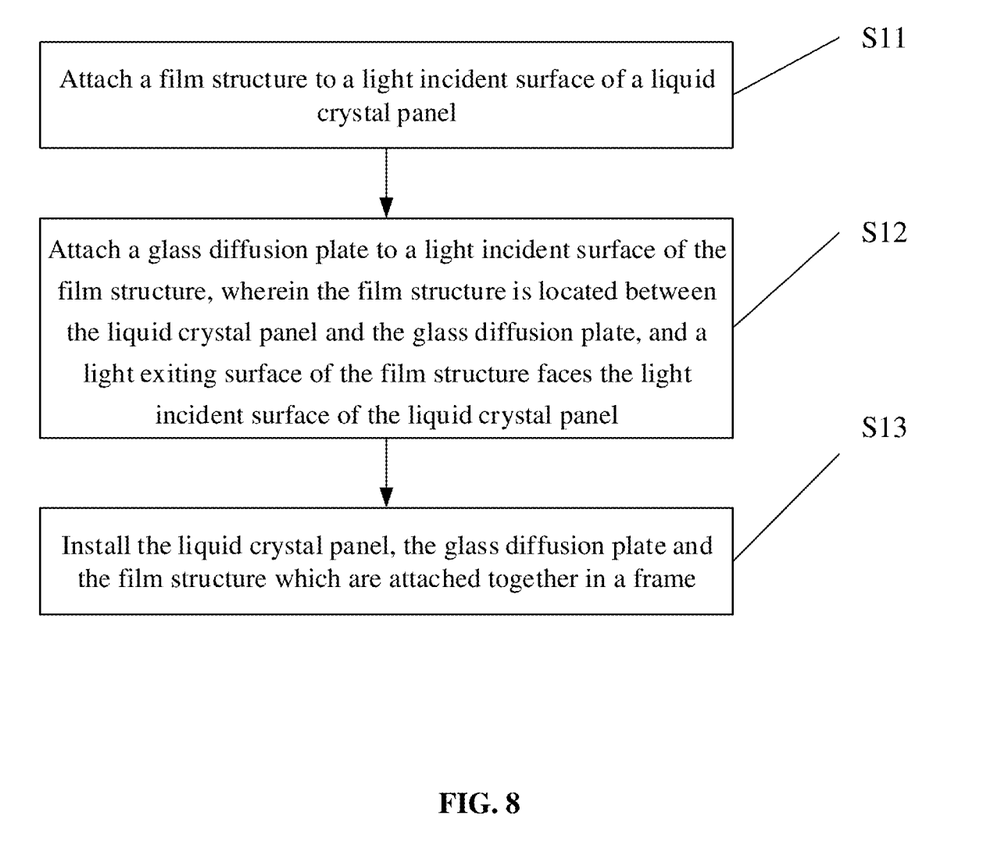
FIG. 8 is a flow chart of a manufacturing method of a display assembly according to an exemplary embodiment.

FIG. 8 is a flow chart of a manufacturing method of a display assembly according to an exemplary embodiment.

For example, the display assembly may be the display assembly described above. As shown in FIG. 8, the manufacturing method includes the following steps.

In step S11, a film structure is attached to a light incident surface of a liquid crystal panel.

In step S12, a glass diffusion plate is attached to a light incident surface of the film structure, in which the film structure is located between the liquid crystal panel and the glass diffusion plate, and a light exiting surface of the film structure faces the light incident surface of the liquid crystal panel.

In step S13, the liquid crystal panel, the glass diffusion plate and the film structure, which are attached together, are installed in a frame.

In the embodiment, the film structure is attached to the light incident surface of the liquid crystal panel, and the glass diffusion plate is attached to the light incident surface of the film structure. Accordingly, the black region is not directly supported through the frame to realize the assembly of the liquid crystal panel. Instead the whole liquid crystal panel is indirectly supported through the glass diffusion plate to realize the assembly of the liquid crystal panel. In this way, the support area may be increased, and the reliability of assembly of the display assembly may be improved. Furthermore, in the embodiments of the disclosure, the assembly manner of the liquid crystal panel may adapt to the trend of narrowing of the black region of the liquid crystal panel, so that the assembly of the liquid crystal panel has universality.

In some embodiments, the step S13 that the liquid crystal panel, the glass diffusion plate and the film structure, which are attached together, are installed in the frame includes the following operations: a bonding agent is coated on the frame through an adhesive dispensing process; and side surfaces of the liquid crystal panel, the glass diffusion plate and the film structure, which are attached together, are bonded in the frame through the bonding agent.

In some embodiments, the step S11 that the film structure is attached to the light incident surface of the liquid crystal panel includes the following operation: the film structure is completely attached to the light incident surface of the liquid crystal panel through a first bonding layer.

In some embodiments, the step S12 that the glass diffusion plate is attached to the light incident surface of the film structure includes the following operation: the glass diffusion plate is completely attached to the light incident surface of the film structure through a second bonding layer.

In some embodiments, the manufacturing method further includes the following steps: a lug boss is formed on the frame in a direction extending into inside of the frame; and an edge of the glass diffusion plate is disposed between the lug boss and the liquid crystal panel so as to enable the lug boss to support the glass diffusion plate.

In some embodiments, the manufacturing method further includes the following step: a projection of the lug boss onto the liquid crystal panel is disposed in a black region of the liquid crystal panel.

In some embodiments, the manufacturing method further includes the following step: before the liquid crystal panel, the glass diffusion plate and the film structure, which are attached together, are installed, a back plate provided with a light source component is installed below the lug boss on the frame.

The step that the liquid crystal panel, the glass diffusion plate and the film structure, which are attached together, are installed in the frame includes the following operation: the liquid crystal panel, the glass diffusion plate and the film structure which are attached together are installed in the frame above the light source component.

In some embodiments, the step that the back plate provided with the light source component is installed below the lug boss on the frame includes the following operations: the light source component is installed on the back plate and is aligned with the lug boss, and a second gap is formed between the light source component and the frame; and the installed back plate and light source component are disposed below the lug boss on the frame.

In some embodiments, the manufacturing method further includes the following step: the light source component and the glass diffusion plate are adjusted to form a first gap between the light source component and the glass diffusion plate.

With respect to the manufacturing method in the above embodiments, the implementation manner of the manufacturing method has been described in detail in the embodiments of the display assembly, and will not be repeated here.

Figure 9:
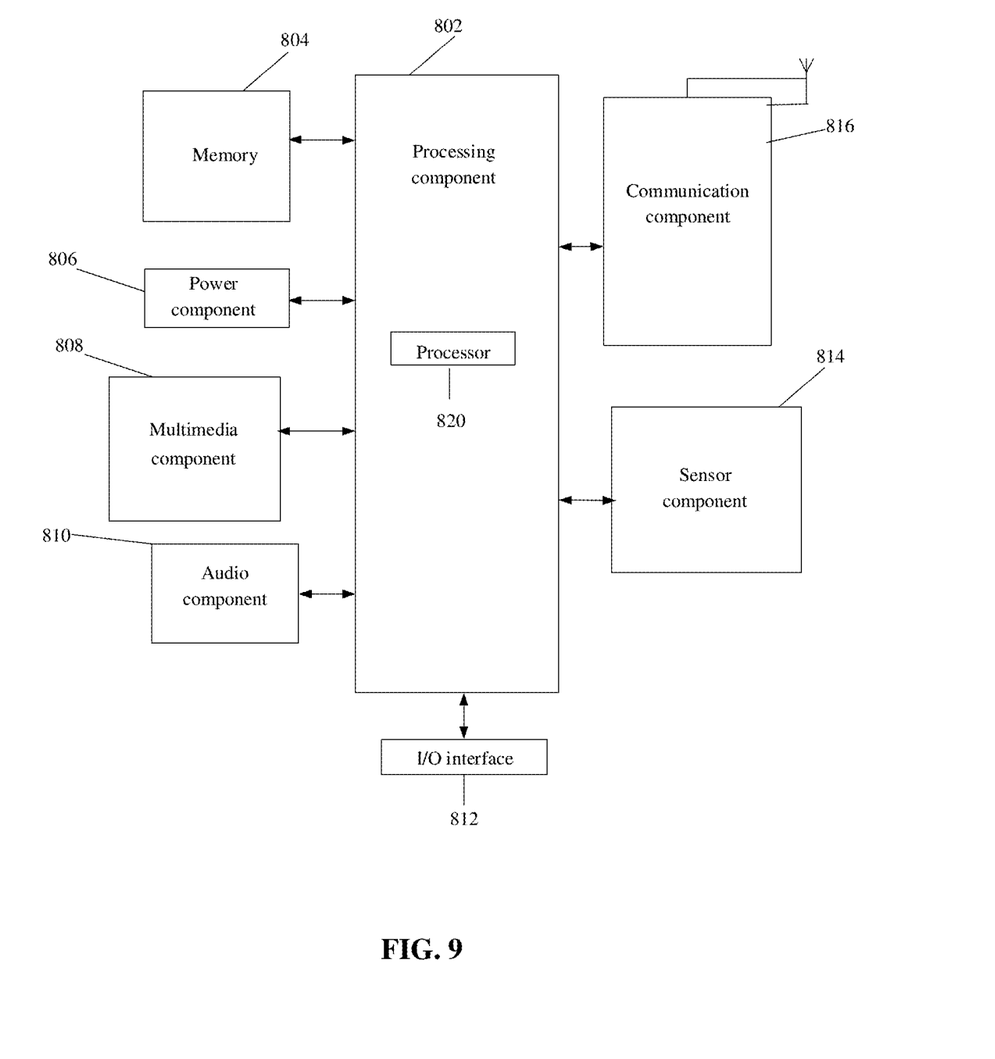
FIG. 9 is a block diagram of a terminal device according to an exemplary embodiment.

FIG. 9 is a block diagram of a terminal device according to an exemplary embodiment. For example, the terminal device may be a mobile phone, a computer, a digital broadcast terminal, a messaging device, a game console, a tablet device, a medical device, a fitness device, a personal digital assistant, and the like.

Referring to FIG. 9, the terminal device may include one or more of the following components: a processing component 802, a memory 804, a power component 806, a multimedia component 808, an audio component 810, an Input/Output (I/O) interface 812, a sensor component 814, and a communication component 816.

The processing component 802 typically controls overall operations of the terminal device, such as the operations associated with display, telephone calls, data communications, camera operations, and recording operations. The processing component 802 may include one or more processors 820 to execute instructions to perform all or part of the steps in the above method. Moreover, the processing component 802 may include one or more assemblies to facilitate the interaction between the processing component 802 and other components. For instance, the processing component 802 may include a multimedia assembly to facilitate the interaction between the multimedia component 808 and the processing component 802.

The memory 804 is configured to store various types of data to support the operation on the terminal device. Examples of such data include instructions for any applications or methods operated on the terminal device, contact data, phone book data, messages, pictures, videos, etc. The memory 804 may be implemented using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or an optical disk.

The power component 806 provides power to various components of the terminal device. The power component 806 may include a power management system, one or more power sources, and any other components associated with the generation, management, and distribution of power in the terminal device.

The multimedia component 808 includes a display panel providing an output interface between the terminal device and a user. In some embodiments, the display panel may include a Liquid Crystal Display (LCD) and a Touch Panel (TP). If the display panel includes the TP, the display panel may be implemented as a touch screen to receive input signals from the user. The TP includes one or more touch sensors to sense touches, slides, and gestures on the TP. The touch sensors may not only sense a boundary of a touch or slide action, but also sense a period of time and a pressure associated with the touch or slide action. In some embodiments, the multimedia component 808 includes a front camera and/or a rear camera. The front camera and/or the rear camera may receive external multimedia data while the terminal device is in an operation mode, such as a photographing mode or a video mode. Each of the front camera and the rear camera may be a fixed optical lens system or may have focus and optical zoom capabilities.

The audio component 810 is configured to output and/or input audio signals. For example, the audio component 810 includes a microphone (MIC) configured to receive external audio signals when the terminal device is in an operation mode, such as a call mode, a recording mode, and a voice recognition mode. The received audio signals may be further stored in the memory 804 or transmitted via the communication component 816. In some embodiments, the audio component 810 further includes a speaker configured to output audio signals.

The I/O interface 812 provides an interface between the processing component 802 and peripheral interface assemblies such as a keyboard, a click wheel, and buttons. These buttons may include, but are not limited to, a home button, a volume button, a starting button, and a locking button.

The sensor component 814 includes one or more sensors to provide status assessments of various aspects of the terminal device. For instance, the sensor component 814 may detect an open/closed status of the terminal device, relative positioning of components such as a display and a keypad of the terminal device, a change in position of the terminal device or a component of the terminal device, a presence or absence of user contact with the terminal device, an orientation or an acceleration/deceleration of the terminal device, and a change in temperature of the terminal device. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an acceleration sensor, a gyroscope sensor, a magnetic sensor, a pressure sensor, or a temperature sensor.

The communication component 816 is configured to facilitate wired or wireless communication between the terminal device and other devices. The terminal device may access a wireless network based on a communication standard, such as WiFi, 4G, or 5G, or a combination thereof. In an exemplary embodiment, the communication component 816 receives broadcast signals or broadcast associated information from an external broadcast management system via a broadcast channel. In an exemplary embodiment, the communication component 816 further includes a Near Field Communication (NFC) assembly to facilitate short-range communications. In an exemplary embodiment, the communication component 816 may be implemented based on a Radio Frequency Identification (RFID) technology, an Infrared Data Association (IrDA) technology, an Ultra-Wideband (UWB) technology, a Bluetooth (BT) technology, and other technologies.

In exemplary embodiments, the terminal device may be implemented with one or more of an Application Specific Integrative Circuit (ASIC), a Digital Signal Processor (DSP), a Digital Signal Processing Device (DSPD), a Programmable Logic Device (PLD), a Field Programmable Gate Array (FPGA), a controller, a micro-controller, a micro-processor, or other electronic components, for performing the above method.

Other embodiments of the disclosure will be apparent to those skilled in the art from consideration of the specification and practice of the disclosure here. This application is intended to cover any variations, uses, or adaptations of the disclosure following the general principles thereof and including such departures from the disclosure as come within known or customary practice in the art. It is intended that the specification and embodiments be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A display assembly, comprising:
   a frame;
   a liquid crystal panel installed in the frame;
   a glass diffusion plate attached to a light incident surface of the liquid crystal panel; and
   a film structure comprising one or more optical films and attached between the liquid crystal panel and the glass diffusion plate, wherein a light incident surface of the film structure faces the glass diffusion plate, a light exiting surface of the film structure faces the light incident surface of the liquid crystal panel, and the liquid crystal panel, the glass diffusion plate, and the film structure are attached together to form an integrated structure,
   wherein the film structure is completely attached to the light incident surface of the liquid crystal panel and the glass diffusion plate is completely attached to the light incident surface of the film structure, and
   wherein the display assembly further comprises:
   a bonding agent located on an inner side of the frame and configured to bond all side surfaces of the glass diffusion plate, the film structure, and the liquid crystal panel to the frame.

2. The display assembly of claim 1, wherein a transparent, first attaching layer is disposed between the liquid crystal panel and the film structure, and the first attaching layer is configured to completely attach the film structure to the light incident surface of the liquid crystal panel; and
   a transparent, second attaching layer is disposed between the film structure and the glass diffusion plate, and the second attaching layer is configured to completely attach the glass diffusion plate to the light incident surface of the film structure.

3. The display assembly of claim 1, wherein the bonding agent is coated on the frame through an adhesive dispensing process.

4. The display assembly of claim 1, wherein a lug boss extending toward an inside of the frame is formed on the frame; and
   an edge of the glass diffusion plate is carried on the lug boss.

5. The display assembly of claim 4, wherein a black region is formed on the liquid crystal panel;
   the black region is located at an edge of the liquid crystal panel; and a projection of the lug boss onto the liquid crystal panel is located in the black region.

6. The display assembly of claim 4, further comprising:
a back plate located below the lug boss; and
a light source component installed on the back plate and located between the glass diffusion plate and the back plate.

7. The display assembly of claim 6, wherein a gap is formed between the light source component and the glass diffusion plate.

8. The display assembly of claim 6, wherein a gap is formed between the frame and a side edge of the light source component.

9. A terminal device comprising a display assembly, the display assembly comprising:
a frame;
a liquid crystal panel installed in the frame;
a glass diffusion plate bonded to a light incident surface of the liquid crystal panel; and
a film structure comprising one or more optical films and bonded between the liquid crystal panel and the glass diffusion plate, wherein a light incident surface of the film structure faces the glass diffusion plate, a light exiting surface of the film structure faces the light incident surface of the liquid crystal panel, and the liquid crystal panel, the glass diffusion plate, and the film structure are bonded together to form an integrated structure,
wherein the film structure is completely attached to the light incident surface of the liquid crystal panel and the glass diffusion plate is completely attached to the light incident surface of the film structure, and
wherein the display assembly further comprises:
a bonding agent located on an inner side of the frame and configured to bond all side surfaces of the glass diffusion plate, the film structure, and the liquid crystal panel to the frame.

10. The terminal device of claim 9, wherein a transparent, first attaching layer is disposed between the liquid crystal panel and the film structure, and the first attaching layer is configured to completely attach the film structure to the light incident surface of the liquid crystal panel; and
a transparent, second attaching layer is disposed between the film structure and the glass diffusion plate, and the second attaching layer is configured to completely attach the glass diffusion plate to the light incident surface of the film structure.

11. The terminal device of claim 9, wherein a lug boss extending toward an inside of the frame is formed on the frame; and
an edge of the glass diffusion plate is carried on the lug boss.

12. The terminal device of claim 11, wherein a black region is formed on the liquid crystal panel;
the black region is located at an edge of the liquid crystal panel; and
a projection of the lug boss onto the liquid crystal panel is located in the black region.

* * * * *